United States Patent [19]

Smolders

[11] Patent Number: 5,895,491

[45] Date of Patent: Apr. 20, 1999

[54] APPARATUS AND METHOD FOR WRITING AN ITEM TO A LINE IN A MEMORY TABLE SHARED BY MULTIPLE PROCESSORS

[75] Inventor: Luc Rene Smolders, Austin, Tex.

[73] Assignee: International Business Machines Corporation, Armonk, N.Y.

[21] Appl. No.: 08/699,287

[22] Filed: Aug. 19, 1996

[51] Int. Cl.$^6$ .................................................. G06F 12/00
[52] U.S. Cl. ........................... 711/147; 395/726; 707/8
[58] Field of Search ........................ 707/8; 395/726; 711/151, 147, 148, 155

[56] References Cited

U.S. PATENT DOCUMENTS

| | | | |
|---|---|---|---|
| 4,961,134 | 10/1990 | Crus | 707/8 |
| 5,333,316 | 7/1994 | Champagne | 707/8 |
| 5,535,365 | 7/1996 | Barriuso | 711/155 |
| 5,623,659 | 4/1997 | Shi | 707/8 |
| 5,692,178 | 11/1997 | Shaughnessy | 395/608 |

*Primary Examiner*—Tod R. Swann
*Assistant Examiner*—Christopher S. Chow
*Attorney, Agent, or Firm*—Richard A. Henkler; Lisa B. Yociss; Andrew J. Dillon

[57] ABSTRACT

A process and apparatus for writing an item of data to a line in a memory table shared by a plurality of processors is disclosed. The process comprises the steps of determining if the item is already in the line; if the item is not in the line, then determining if the line is empty; if the line is empty, then performing the following steps: creating a reservation for the line for a processor requesting to write the item to the line and trying to write, by the processor requesting to write the item to the line, the item to the line. Although more than one processor can hold a reservation for the line, only one processor can add an item to the line since the reservation for the line is removed or cleared in all processors when the first processor, holding a reservation for the line, writes an item to the line.

27 Claims, 2 Drawing Sheets

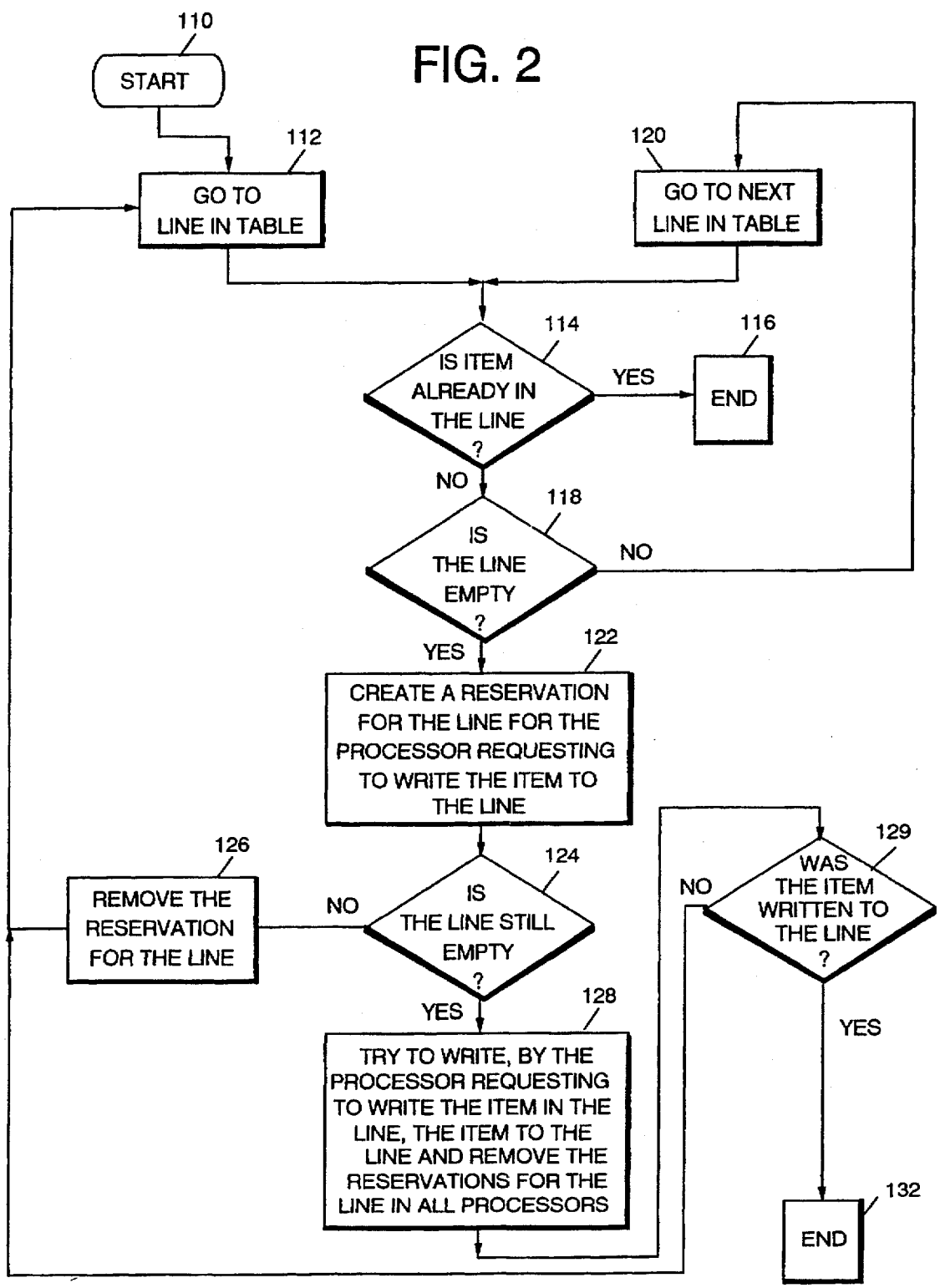

APPARATUS AND METHOD FOR WRITING AN ITEM TO A LINE IN A MEMORY TABLE SHARED BY MULTIPLE PROCESSORS

TECHNICAL FIELD OF THE INVENTION

The present invention relates to the operation of an information handling system having a plurality of processors all sharing the same memory. In particular, the present invention relates to the management of writing an item to a line in a memory table shared by a plurality of processors in an information handling system.

BACKGROUND OF THE INVENTION

In an information handling system having multiple CPUs which add items of data to a single memory table, there is a need to prevent an item from being stored in the memory table twice and a need to prevent two CPUs from writing to the same line in the memory table. The conventional solution is to create a lock from memory to the entire table or part of it, such as for each individual line. The first option can be very slow if the table has many lines and is accessed a lot. In other words, if only one CPU can access the table at a time the ability to add items to the memory table will be very slow. The second option can be very expensive in terms of memory usage, since for each line a lock is created, and each new lock is stored in memory. In summary, what is needed is a process for writing an item to a line in a memory table shared by a plurality of processors, wherein no locks are used.

SUMMARY OF THE INVENTION

Accordingly, the present invention is a process for writing an item to a line in a memory table shared by a plurality of processors comprising the steps of determining if the item is already in the line; if the item is not in the line, then determining if the line is empty; if the line is empty, performing the following steps: creating a reservation for the line for the processor requesting to write the item to the line; and trying to write, by the processor requesting to write the item in the line, the item to the line.

The present invention also includes an apparatus for writing an item to a line in a memory table shared by a plurality of processors and a computer program product comprising a program storage device readable by a computer system tangibly embodying a program of instructions executable by the computer system to perform a process for writing an item to a line in a memory table shared by a plurality of processors.

BRIEF DESCRIPTION OF THE DRAWINGS

FIG. 2 is a block diagram illustrating a process according to the present invention.

DETAILED DESCRIPTION OF A PREFERRED EMBODIMENT OF THE INVENTION

Figure 1:
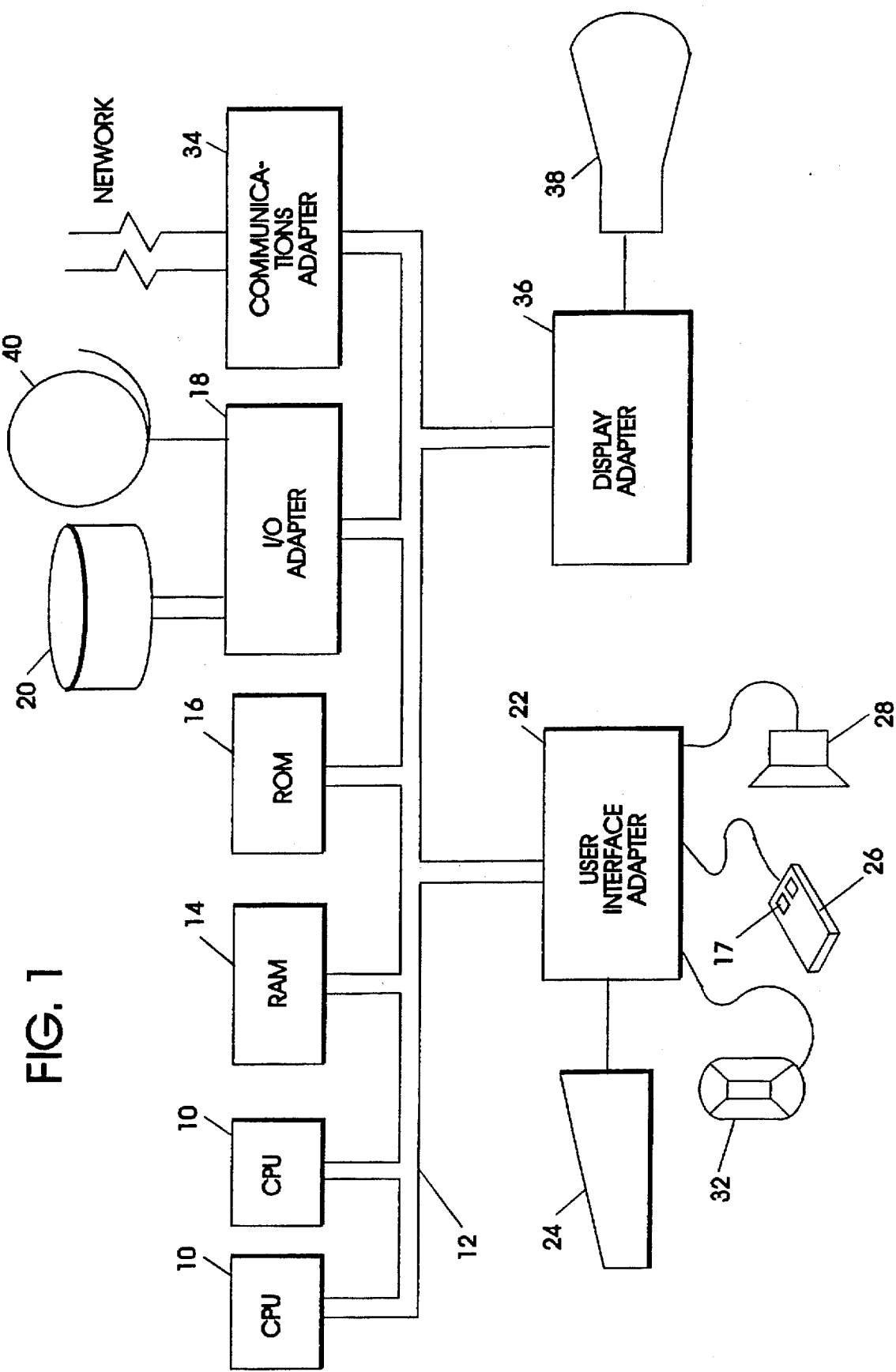
FIG. 1 is an information handling system embodying in the present invention.

A representative hardware environment for practicing the present invention is depicted in FIG. 1, which illustrates a typical hardware configuration of an information handling system in accordance with the subject invention having at least two processors or central processing units (CPUs) 10, 11. CPUs 10, 11 are interconnected via system bus 12 to random access memory (RAM)14, read only memory (ROM) 16, an input/output (I/O) adapter 18 for connecting peripheral devices, such as disk units 20 and tape drives 40, to bus 12, user interface adapter 22 for connecting keyboard 24, mouse 26, speaker 28, microphone 32, and/or other user interface devices such as touch screen device (not shown) to bus 12, communication adapter 34 for connecting the information handling system to a data processing network, and display adapter 36 for connecting bus 12 to display device 38.

Referring now to FIG. 2, a process for writing an item of data to a line having a specific address in a memory table, such as a hash table, shared by a plurality of processors 10, 11 is illustrated. The process starts at step 110. At step 112, a hash function or the like is utilized to go to a line in the table, i.e. access to a line in the table. At step 114, the process determines if the item is already in the line. If the item to be added to the line in the memory table is already in the line, the process ends at step 116. Otherwise, the process proceeds to step 118, where it is determined if the line is empty. If the line is not empty, i.e., the line contains an item, then the process proceeds to step 120 where the hash function is again used to go to the next line in the table. After going to the next line in the table in step 120, the process proceeds to step 114. If the line is empty, as determined in step 118, the process proceeds to step 122, where a reservation for the line, for the processor requesting to write the item to the line, is created. After creating the reservation, the process proceeds to step 124 where it is determined if the line is still empty. If the line is not still empty, the process proceeds to step 126, where the reservation for the line is removed. After removing the reservation for the line in step 126, the process returns to steps 112 and 114 to determine if the item is now in the line.

If it is determined that the line is still empty in step 124, the process proceeds to step 128, where the processor requesting to write the item in the line tries to write the item to the line, or in other words, add the item to the memory table and when writing the item in the line, removing the reservations for the line in all processors. In other words, all the reservations in all processors for that line are cleared or removed at the same time or atomically. The process then proceeds to step 129 where it is determined whether the item was written to the line by the processor requesting to write the item in the line. It is necessary to determine whether the item was written in the line by the processor requesting to write the item in the line since another processor holding a reservation for the line may have already written to the line and cleared the reservation for the line in all processors. Thus, a write of the item in the line could fail if the reservation was cleared by another processor. In other words, the first processor holding a reservation for the line that tries to write in the line will succeed and at the same time or atomically with the write, clear or remove the reservations for the line from all other processors. Removing or clearing the reservation for the line in all processors atomically with a successful write in the line ensures that only one processor writes an item to the line. And, determining if an item is already in the line in step 114 ensures that a particular item is added only once to the memory table.

If the item was successfully written or added to the memory table as determined in step 129, the process proceeds to and ends in step 132. If the item was not successfully written in the line of the memory table in step 128, then the process returns to steps 112 and 114 to determine whether the item is already in the line to thereby prevent adding the same item twice in the table. If the item was not successfully written in the line of the memory table in step 128, then this means another processor was able to write first to the line and clear or remove the reservation for the line in all the processors including the processor, in step 128, requesting to write the item in the line.

The process of the present invention is preferably implemented in a PowerPC™ based information handling computer system ("PowerPC" is a trademark of the IBM Corporation) using a computer readable medium, such as disk units, tape drives or the like, which implements the following program:

Let A be the item to add to the table and
Let the table entries be initialized as NULL
for (p=Hash(A); p<=End_of_Table; p++)

```
{
if (*p == A)          # is A already in the table ?
    return;           # YES : we are done
if (*p != NULL)       # is the line empty ?
    continue;         # NO : go try next line
q = LWARX(p);         # read line and get the reservation for it
if (q == NULL)        # is the line still empty ?
    {                 # YES : try to use the reservation
    rc = STWCX(q);    # try to write to the line
    if (rc == 0)      # did it work (was the reservation still valid )?
        return;       # YES : we are done
    else
        {             # NO : our reservation had already been cleared
        p—;           # go retry the same line to prevent
        continue;     # adding same item twice in the table
        }
    }
else
    {                 # the line is not empty anymore.
    STWCX(q);         # clear the reservation and go retry
    p—;               # the same line to make sure the item
    }                 # was not added by another CPU.
}
```

PowerPC™ includes a reservation mechanism for reserving a memory line which is accessed using the LWARX and STWCX instructions. For a description of the LWARX and STWCX instructions, see PowerPC™ 601 RISC Microprocessor User's Manual, pages 10–111 and 10–202, respectively. LWARX is a load instruction which also reserves a source address. Only one CPU at a time will get to use its reservation for a line having a specific address. The first processor to do a STWCX, which is a store conditional on having the reservation, will succeed and at the same time (atomically) clear the reservation held by all processors, for the same line or address. All subsequent STWCX on other processors will therefore fail.

It will be appreciated that information handling systems based on other CPU architectures having a set of instructions different from those instructions of the PowerPC™ may be used within the scope of the invention. It will also be appreciated that instructions other than the LWARX and STWCX instructions may be used to carry out the reservation mechanism according to the present invention. For example, some processors such as the MIPS R4000 and Digital's Alpha AXP also use a pair of special load and store instructions to provide an atomic read-modify-write operation. This load-linked instruction (also called the load-locked instruction) loads a value from memory into a register and sets a flag that causes the hardware to monitor the location. If any processor writes to such a monitored location, the hardware will clear the flag. The store-conditional instruction stores a new value into the location provided the flag is still set. In addition, it sets the value of another register to indicate if the store occurred. This mechanism is equivalent to the reservation mechanism used in conjunction with the LWARX and STWCX instructions and can, therefore, be used with the present invention.

Although the present invention and its advantages have been described in detail, it should be understood that various changes, substitutions and alterations can be made herein without departing from the spirit or scope of the invention as defined in the appended claims.

What is claimed is:

1. A process for writing an item to a line in a memory table shared by a plurality of processors, said process comprising the steps of:

a) determining if the item is already in the line;

b) if the item is not in the line, then determining if the line is empty;

c) if the line is empty, then:

1) creating a reservation for the line for one of the plurality of processors requesting to write the item to the line, all others of the plurality of processors being permitted to write to the line during the reservation; and 2) trying to write, by the one of the plurality of processors requesting to write the item in the line, the item to the line.

2. The process as recited in claim 1, wherein the step of creating further includes the step of creating a reservation for the line for each processor requesting to write to the line.

3. The process as recited in claim 2, further comprising the step of removing the reservation for the line from each processor holding the reservation for the line after one of the plurality of processors writes an item to the line, such that only one processor writes an item to the line.

4. The process as recited in claim 1, wherein if the line is not empty, then repeating steps a)–c) for a new line.

5. The process as recited in claim 1, wherein if the item was not written to the line by one of the plurality of processors requesting to write the item in the line, then repeating steps a)–c) for the same line to thereby prevent writing the item to two lines in the memory table.

6. The process as recited in claim 1, further comprising the step of determining if the line is empty after creating a reservation for the line and before trying to write the item to the line.

7. The process as recited in claim 6, wherein if the line is not empty, then removing the reservation for the line from the one of the plurality of processors requesting to write the item to the line.

8. The process as recited in claim 7, further comprising the step of determining whether the item was written to the line by another of the plurality of processors to thereby ensure that the item is only written to the memory table once.

9. The process as recited in claim 1, further comprising the step of performing a hash function to determine the address of the line.

10. An apparatus for writing an item to a line in a memory table shared by a plurality of processors, said apparatus comprising:

a plurality of processors;

a memory table including lines of memory operably coupled to said processors;

means for determining if the item is already in a first line of said lines;

means for determining if said first line is empty if the item is not in said first line;

means for creating a reservation for said first line for a processor requesting to write the item to said first line if said first line is empty, all others of the plurality of processors being permitted to write to the line during the reservation; and wherein said processor requesting to write the item to said first line, tries to write the item to said first line if said first line is empty.

11. The apparatus as recited in claim 10, wherein said means for creating includes means for creating a reservation for said first line for each said processor requesting to write to said first line.

12. The apparatus as recited in claim 11, further comprising means for removing said reservation for said first line from each said processor holding said reservation for said first line after one of said processors writes an item to said first line such that only one of said processors writes an item to said first line.

13. The apparatus as recited in claim 10, further comprising:

means for determining if the item is already in a new line if said first line is not empty;

means for determining if said new line is empty;

means for creating a reservation for said new line for said processor requesting to write the item in said first line if said new line is empty; and wherein said processor requesting to write the item to said first line tries to write the item to said new line if said new line is empty.

14. The apparatus as recited in claim 10, further comprising means for determining if the item is already in said first line if the item was not written to said first line by said processor requesting to write the item to said first line to thereby prevent writing the item to two lines in the said memory table.

15. The apparatus as recited in claim 10, further comprising means for determining if said first line is empty after creating said reservation for said first line and before trying to write the item to said first line.

16. The apparatus as recited in claim 15, further comprising means for removing said reservation for said first line from said processor requesting to write the item to said first line.

17. The apparatus as recited in claim 16, further comprising means for determining whether the item was written to said first line by one of said other processors to thereby ensure that the item is only written to said memory table once.

18. The apparatus as recited in claim 10, further comprising means for performing a hash function to determine the address of said first line wherein said memory table is a hash table.

19. The computer program product comprising:

a program storage device readable by a computer system tangibly embodying a program of instructions executable by said computer system to perform a process for writing an item to a line in a memory table shared by a plurality of processors, said process comprising the steps of:

a) determining if the item is already in the line;

b) if the item is not in the line, then determining if the line is empty;

c) if the line is empty, then:

1) creating a reservation for the line for a processor requesting to write the item to the line, all others of the plurality of processors being permitted to write to the line during the reservation; and 2) trying to write, by the processor requesting to write the item to the line, the item to the line.

20. The process as recited in claim 19, wherein the step of creating further includes the step of creating a reservation for the line for each processor requesting to write to the line.

21. The process as recited in claim 20, further comprising the step of removing the reservation for the line from each processor holding the reservation for the line after one of the processors writes an item to the line, such that only one processor writes an item to the line.

22. The process as recited in claim 19, wherein if the line is not empty then repeating steps a)–c) for a new line.

23. The process as recited in claim 19, wherein if the item was not written to the line by the processor requesting to write the item in the line, then repeating steps a)–c) for the same line to thereby prevent writing the item to two lines in the memory table.

24. The process as recited in claim 19, further comprising the step of determining if the line is empty after creating a reservation for the line and before trying to write the item to the line.

25. The process as recited in claim 24, wherein if the line is not empty then removing the reservation for the line from the processor requesting to write the item to the line.

26. The process as recited in claim 25, further comprising the step of determining whether the item was written to the line by another processor to thereby ensure that the item is only written to the memory table once.

27. The process as recited in claim 19, further comprising the step of preforming a hash function to determine the address of the line.

* * * * *